US012683772B2

(12) United States Patent　　　　(10) Patent No.:　US 12,683,772 B2
Lehtovirta et al.　　　　　　　　　　(45) Date of Patent:　Jul. 14, 2026

(54) ESTABLISHMENT OF FORWARD SECRECY DURING DIGEST AUTHENTICATION

(71) Applicant: Telefonaktiebolaget LM Ericsson (publ), Stockholm (SE)

(72) Inventors: Vesa Lehtovirta, Espoo (FI); Mohit Sethi, Helsinki (FI); Jari Arkko, Kauniainen (FI); John Mattsson, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 105 days.

(21) Appl. No.: 18/294,574

(22) PCT Filed: Aug. 3, 2021

(86) PCT No.: PCT/EP2021/071619
§ 371 (c)(1),
(2) Date: Feb. 2, 2024

(87) PCT Pub. No.: WO2023/011702
PCT Pub. Date: Feb. 9, 2023

(65) Prior Publication Data
US 2024/0340164 A1　　Oct. 10, 2024

(51) Int. Cl.
*H04L 9/08*　　　　(2006.01)
*H04L 9/06*　　　　(2006.01)
(52) U.S. Cl.
CPC .......... *H04L 9/0841* (2013.01); *H04L 9/0618* (2013.01); *H04L 9/0861* (2013.01)
(58) Field of Classification Search
CPC ... H04L 2209/60; H04L 9/002; H04L 9/0618; H04L 9/0643; H04L 9/0841; H04L 9/0861; H04L 9/3271
See application file for complete search history.

(56) References Cited

U.S. PATENT DOCUMENTS 7,194,621 B1 * 3/2007 Nguyen .............. H04L 63/0442
　　　　　　　　　　　　　　713/162
7,549,048 B2 * 6/2009 Freeman ............. H04L 63/0428
　　　　　　　　　　　　　　713/171
(Continued)

FOREIGN PATENT DOCUMENTS

WO　　2019216949 A1　11/2019

OTHER PUBLICATIONS

International Search Report and Written Opinion of the International Searching Authority, PCT/EP2021/071619, mailed Apr. 25, 2022, 14 pages.
(Continued)

*Primary Examiner* — Sharon S Lynch
(74) *Attorney, Agent, or Firm* — Sage Patent Group

(57) ABSTRACT

Mechanisms for establishing forward secrecy during digest access authentication are provided. A method is performed by a client device. The method includes performing digest access authentication with a server device. The digest access authentication includes sending a first request towards the server device for accessing a resource; and receiving a first response. The first response includes a challenge and a public component of an asymmetric key pair for a key exchange with the server device. The digest access authentication includes calculating, using a digest algorithm, a response parameter based at least on the challenge and the public component of the asymmetric key pair; and sending a second request towards the server device for accessing the resource. The second request includes the calculated response parameter. The digest access authentication includes receiving a second response from the server device that indicates successful digest access authentication with the server device.

8 Claims, 9 Drawing Sheets

(56) References Cited

U.S. PATENT DOCUMENTS

| | | | | |
|---|---|---|---|---|
| 7,747,865 B2 * | 6/2010 | Krawczyk | ............ | H04L 9/0844 |
| | | | | 713/180 |
| 8,914,636 B2 * | 12/2014 | Cha | ...................... | H04W 12/06 |
| | | | | 713/171 |
| 9,015,473 B2 * | 4/2015 | Costa | ...................... | H04L 63/10 |
| | | | | 713/156 |
| 9,210,145 B2 * | 12/2015 | Mulla | ...................... | H04L 63/08 |
| 9,319,223 B2 * | 4/2016 | Nix | ...................... | H04L 9/0861 |
| 9,742,562 B2 * | 8/2017 | Nix | ...................... | H04L 9/0861 |
| 9,954,853 B2 * | 4/2018 | Jøsang | ................... | H04L 63/10 |
| 10,187,206 B2 * | 1/2019 | Nix | ...................... | H04L 9/0861 |
| 10,700,856 B2 * | 6/2020 | Nix | ...................... | H04L 9/0662 |
| 11,082,218 B2 * | 8/2021 | Nix | ...................... | H04W 80/04 |
| 11,736,283 B2 * | 8/2023 | Nix | ......................... | H04W 4/70 |
| | | | | 713/168 |
| 12,166,869 B2 * | 12/2024 | Nix | ...................... | H04W 80/04 |
| 2006/0179319 A1 * | 8/2006 | Krawczyk | ............ | H04L 9/3247 |
| | | | | 713/180 |
| 2009/0158032 A1 * | 6/2009 | Costa | ................. | H04L 63/0823 |
| | | | | 380/270 |
| 2013/0174241 A1 * | 7/2013 | Cha | ...................... | H04L 63/0815 |
| | | | | 726/7 |
| 2014/0095873 A1 * | 4/2014 | Mulla | ................ | H04L 63/0807 |
| | | | | 713/168 |
| 2015/0143125 A1 * | 5/2015 | Nix | ...................... | H04L 9/0861 |
| | | | | 713/171 |
| 2015/0281211 A1 * | 10/2015 | Jøsang | ................... | H04L 63/10 |
| | | | | 726/5 |
| 2016/0234020 A1 * | 8/2016 | Nix | ...................... | H04L 9/0861 |
| 2017/0373845 A1 * | 12/2017 | Nix | ...................... | H04L 9/0861 |
| 2019/0097794 A1 * | 3/2019 | Nix | ......................... | G06F 21/33 |
| 2020/0280439 A1 * | 9/2020 | Nix | ...................... | H04W 12/03 |
| 2021/0351923 A1 * | 11/2021 | Nix | ...................... | H04L 9/3247 |
| 2023/0379148 A1 * | 11/2023 | Nix | ...................... | H04L 9/0662 |
| 2025/0106013 A1 * | 3/2025 | Nix | ...................... | H04L 9/3263 |

OTHER PUBLICATIONS

Azad, Muhammad Ajmal et al., "Authentic Caller: Self-Enforcing Authentication in a Next-Generation Network," IEEE Transactions on Industrial Informatics, vol. 16, No. 5, May 2020, 10 pages.

* cited by examiner

ESTABLISHMENT OF FORWARD SECRECY DURING DIGEST AUTHENTICATION

CROSS REFERENCE TO RELATED APPLICATIONS

This application is a 35 U.S.C. § 371 national stage application of PCT International Application No. PCT/EP2021/071619 filed on Aug. 3, 2021, the disclosure and content of which is incorporated by reference herein in its entirety.

TECHNICAL FIELD

Embodiments presented herein relate to methods, a client device, a server device, computer programs, and a computer program product for establishing forward secrecy during digest access authentication.

BACKGROUND

In general terms, in computer security, challenge-response authentication is a family of protocols in which one party presents a question (a "challenge") and another party must provide a valid answer (a "response") to be authenticated. The simplest example of a challenge-response protocol is password authentication, where the challenge is asking for the password and the valid response is based on the correct password.

So-called HTTP Digest Access Authentication, as defined in RFC 7616 published by the Internet Engineering Task Force (IETF), defines a simple challenge-response authentication method for the Hypertext Transfer Protocol (HTTP). When a client device using HTTP tries to access a protected resource at a server device, the server device can send a challenge and authenticate the client device before allowing access to the protected resource. HTTP Digest authentication provides better security when compared to the basic HTTP authentication scheme defined in RFC 7617. An example message exchange between a client device and a server device for HTTP digest is shown in FIG. 1.

Step S1: The client device sends an HTTP request (shown as GET) to access a protected resource at the server device.

Step S2: The server device sends an HTTP response with the status code 401 unauthorized. This message includes a WWW-Authenticate header (where WWW is short for world wide web). The header value includes parameters such as realm, nonce, algorithm, qop, etc. The realm is a string that contains information about the entity (server) performing authentication. It can be of the form somename@example.org. The nonce is a unique string generated by the server device for each 401 response with the WWW-Authenticate header. The nonce ensures freshness during authentication and prevents replay attacks. The algorithm is a string indicating the algorithm which the client device should use for preparing the digest response. The algorithms can be MD5, SHA256, etc. or MD5-sess, SHA-256-sess, etc. The 'sess' denotes the session variant of digest authentication and use slightly different calculations for generating the correct digest response. The session variant creates a session key for the authentication of subsequent requests and responses. The qop defines the quality of protection parameter and can be "auth" for authentication and "auth-int" for authentication with integrity protection. These parameters comprise a challenge for the client device that the client device must successfully respond to before being allowed to access the protected resource.

Step S3: The client device sends another HTTP request (shown as GET) with an Authorization header. The Authorization header includes parameters such as username, qop, response, uri etc. The username is the name of user of the server device. The qop defines the quality of protection selected by the client device. It is one of the qop offered by the server device. The response is a string of (hexadecimal) digits that is calculated based on the challenge and it proves the client device's knowledge of the password. The uri is the requested uniform resource identifier. In the example shown in FIG. 1, the requested uri is "/resource/protected". The client device uses the specified algorithm to compute the response based on the challenge. One example of how the response can be calculated will be described in the following.

response=H(H(A1):nonce:nc:cnonce:qop:H(A2)), where
H(x) is a cryptographic hash function operating on the variable x,
A1=username:realm:passwd, if the algorithm used is MD5, SHA256 etc., or
A1=H(username:realm:passwd:nonce-prime:cnonce-prime), if the algorithm uses is the session variant, i.e., MD5-sess, SHA-256-sess. Here nonce-prime is the nonce sent by the server in the WWW-Authenticate header and cnonce-prime is the cnonce included by the client in the response, and
A2=method:request-uri, if the qop used is auth, or
A2=method:request-uri:H(entity-body), if the qop used is auth-int. The entity-body is obtained from the message-body by decoding any Transfer-Encoding that might have been applied.

The method depends on the request HTTP method (for example: GET, PUT, POST etc.).

Step S4: The server device verifies the response from the client device. If the response is correct, the server device sends an HTTP response with status code 200 OK to the client device. The response can also include an Authentication-Info header to optionally support mutual authentication, whereby, the server device also proves its knowledge of the password in the parameter rspauth of the Authentication-Info header. The server knowledge of password in the Authentication-Info header is calculated similarly as the response is calculated by the client device, except with the following differences:

A2=request-uri, if qop used is auth, and
A2=request-uri ":" H(entity-body).

That is, the calculations are almost identical except that the requested method is not included.

The Digest Authentication scheme can also be used for authenticating users to proxies. In such scenarios, the WWW-Authenticate header is replaced with the Proxy-Authenticate header, the Authorization header is replaced with the Proxy-Authorization header, and the Authentication-Info with the Proxy-Authentication-Info header, respectively.

Various specifications employ HTTP Digest authentication in other application domains. RFC 3310 published by IETF and RFC 4169 published by IETF extend HTTP digest to allow the usage of the Authentication and Key Agreement (AKA) as a one-time password generation mechanism. According to digest AKA, the client device has access to a local long-term secret in the Universal Subscriber Identity Module (USIM)/IP Multimedia Services Identity Module (ISIM). The server device on the other hand obtains an Authentication Vector (AV) from an Authentication Center (AuC) or equivalent node, such as an Authentication Server Function (AUSF), in the home network of the client device. An example message exchange between a client device and a server device for Digest AKA authentication is shown in FIG. 2.

Step S1a: The client device sends an HTTP request (shown as GET) to access a protected resource at the server device. Step 1a is thus the same as above step S1.

Step S2a: The server device sends an HTTP response with the status code 401 unauthorized. This message includes two WWW-Authenticate headers. The header values include parameters such as realm, nonce, algorithm, qop, etc. A random challenge RAND and a network authenticator token AUTN are added to the nonce header parameter.

Step S3a: The client device verifies the AUTN contained in the received nonce. If the AUTN can be correctly verified, the client device calculates a digest response using the RES value as password. The RES value is calculated using a locally stored long-term secret. The digest response is sent in another HTTP request (shown as GET in the figure) with an Authorization header. The password used by the client device when calculating the response is PRF(RES‖IK‖CK, "http-digest-akav2-password") where CK is cipher key, IK is an Integrity key, RES is the response calculated from AKA, and where PRF is short for pseudo-random function.

Step S4a: The server device verifies the response from the client device against an expected response (XRES) in the authentication vector. If the response is correct, the server device sends an HTTP response with status code 200 OK to the client device. The response can also include an Authentication-Info header to indicate successful authentication. While AKA inherently supports mutual authentication, this response can include the response-auth (or rspauth) field calculated from the XRES.

Keys resulting from digest authentication can be used to protect the ensuing traffic. For example, digest AKA as specified in RFC 4169 published by IETF exports the keys CK' and IK' after authentication for those keys to be used to provide confidentiality and integrity. Similarly, RFC 2831 published by IETF defines how the value of H(A1) as calculated during the digest authentication can be used for deriving keys for integrity and confidentiality protection of traffic. In fact, HTTP digest AKA authentication is in Generic Bootstrapping Authentication (GBA) used solely as a means of creating keys to protect traffic.

Keys resulting from digest authentication do not provide forward secrecy. That is, if the password (or USIM/ISIM credentials in Digest AKA) are compromised, a potential attacker can decrypt all previous messages, as communicated between the server device and the client device, that were protected with keys resulting directly or indirectly from digest authentication.

Hence, there is still a need for improved digest access authentication between a server device and a client device.

SUMMARY

An object of embodiments herein is to address the above issues by providing efficient digest access authentication between a server device and a client device that does not suffer from the above issues, or at least where the above issues have been mitigated or reduced.

According to a first aspect there is presented a method for establishing forward secrecy during digest access authentication. The method is performed by a client device. The method comprises performing digest access authentication with a server device. The digest access authentication comprises sending a first request towards the server device for accessing a resource. The digest access authentication comprises receiving a first response from the server device. The first response comprises a challenge and a public component of an asymmetric key pair for a key exchange with the server device. The digest access authentication comprises calculating, using a digest algorithm, a response parameter based at least on the challenge and the public component of the asymmetric key pair. The digest access authentication comprises sending a second request towards the server device for accessing the resource. The second request comprises the calculated response parameter. The digest access authentication comprises receiving a second response from the server device. The second response indicates successful digest access authentication with the server device.

According to a second aspect there is presented a client device for establishing forward secrecy during digest access authentication. The client device comprises processing circuitry. The processing circuitry is configured to cause the client device to perform digest access authentication with a server device. The processing circuitry is configured to cause the client device to, as part of performing the digest access authentication send a first request towards the server device for accessing a resource. The processing circuitry is configured to cause the client device to, as part of performing the digest access authentication receive a first response from the server device. The first response comprises a challenge and a public component of an asymmetric key pair for a key exchange with the server device. The processing circuitry is configured to cause the client device to, as part of performing the digest access authentication calculate, using a digest algorithm, a response parameter based at least on the challenge and the public component of the asymmetric key pair. The processing circuitry is configured to cause the client device to, as part of performing the digest access authentication send a second request towards the server device for accessing the resource. The second request comprises the calculated response parameter. The processing circuitry is configured to cause the client device to, as part of performing the digest access authentication receive a second response from the server device. The second response indicates successful digest access authentication with the server device.

According to a third aspect there is presented a client device for establishing forward secrecy during digest access authentication. The client device comprises an authentication module configured to perform digest access authentication with a server device. The client device further comprises, to perform the digest access authentication, a send module configured to send a first request towards the server device for accessing a resource. The client device further comprises, to perform the digest access authentication, a receive module configured to receive a first response from the server device. The first response comprises a challenge and a public component of an asymmetric key pair for a key exchange with the server device. The client device further comprises, to perform the digest access authentication, a calculate module configured to calculate, using a digest algorithm, a response parameter based at least on the challenge and the public component of the asymmetric key pair. The client device further comprises, to perform the digest access authentication, a send module configured to send a second request towards the server device for accessing the resource. The second request comprises the calculated response parameter. The client device further comprises, to perform the digest access authentication, a receive module configured to receive a second response from the server device. The second response indicates successful digest access authentication with the server device.

According to a fourth aspect there is presented a computer program for establishing forward secrecy during digest access authentication, the computer program comprising computer program code which, when run on processing circuitry of a client device, causes the client device to perform a method according to the first aspect.

According to a fifth aspect there is presented a method for establishing forward secrecy during digest access authentication. The method is performed by a server device. The method comprises performing digest access authentication with a client device. The digest access authentication comprises receiving a first request from the client device for accessing a resource. The digest access authentication comprises sending a first response towards the client device for a key exchange with the client device. The first response comprises a challenge and a public component of an asymmetric key pair. The digest access authentication comprises receiving a second request from the client device for accessing the resource. The second request comprises a response parameter. The digest access authentication comprises verifying correctness of the response parameter only when the response parameter matches a corresponding expected response parameter calculated by the server device, using a digest algorithm and based at least on the challenge and the public component of the asymmetric key pair. The digest access authentication comprises sending a second response towards the client device, where the second response indicates successful digest access authentication with the client device, only when having successfully verified correctness of the response parameter.

According to a sixth aspect there is presented a server device for establishing forward secrecy during digest access authentication. The server device comprises processing circuitry. The processing circuitry is configured to cause the server device to perform digest access authentication with a client device. The processing circuitry is configured to cause the server device to, as part of performing the digest access authentication receive a first request from the client device for accessing a resource. The processing circuitry is configured to cause the server device to, as part of performing the digest access authentication send a first response towards the client device for a key exchange with the client device. The first response comprises a challenge and a public component of an asymmetric key pair for a key exchange with the client device. The processing circuitry is configured to cause the server device to, as part of performing the digest access authentication receive a second request from the client device for accessing the resource. The second request comprises a response parameter. The processing circuitry is configured to cause the server device to, as part of performing the digest access authentication verify correctness of the response parameter only when the response parameter matches a corresponding expected response parameter calculated by the server device, using a digest algorithm and based at least on the challenge and the public component of the asymmetric key pair. The processing circuitry is configured to cause the server device to, as part of performing the digest access authentication send a second response towards the client device, where the second response indicates successful digest access authentication with the client device, only when having successfully verified correctness of the response parameter.

According to a seventh aspect there is presented a server device for establishing forward secrecy during digest access authentication. The server device comprises an authentication module configured to perform digest access authentication with a client device. The server device further comprises, to perform the digest access authentication, a receive module configured to receive a first request from the client device for accessing a resource. The server device further comprises, to perform the digest access authentication, a send module configured to send a first response towards the client device for a key exchange with the client device. The first response comprises a challenge and a public component of an asymmetric key pair. The server device further comprises, to perform the digest access authentication, a receive module configured to receive a second request from the client device for accessing the resource. The second request comprises a response parameter. The server device further comprises, to perform the digest access authentication, a verify module configured to verify correctness of the response parameter only when the response parameter matches a corresponding expected response parameter calculated by the server device, using a digest algorithm and based at least on the challenge and the public component of the asymmetric key pair. The server device further comprises, to perform the digest access authentication, a send module configured to send a second response towards the client device, where the second response indicates successful digest access authentication with the client device, only when having successfully verified correctness of the response parameter.

According to an eighth aspect there is presented a computer program for establishing forward secrecy during digest access authentication, the computer program comprising computer program code which, when run on processing circuitry of a server device, causes the server device to perform a method according to the fifth aspect.

According to a ninth aspect there is presented a computer program product comprising a computer program according to at least one of the fourth aspect and the eighth aspect and a computer readable storage medium on which the computer program is stored. The computer readable storage medium could be a non-transitory computer readable storage medium.

Advantageously, these methods, these client devices, these server devices, these computer programs, and this computer program product provide efficient digest access authentication.

Advantageously, the proposed digest access authentication does not suffer from the issues disclosed above.

Advantageously, these methods, these client devices, these server devices, these computer programs, and this computer program product enhance the security of HTTP digest authentication by providing the property of perfect forward secrecy.

Advantageously, these methods, these client devices, these server devices, these computer programs, and this computer program product are implementable in a backwards-compatible way with minimal alternations to existing implementations of digest access authentication schemes.

Advantageously, these methods, these client devices, these server devices, these computer programs, and this computer program product are implementable on the application layer and therefore provide protection regardless of proxies, etc.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
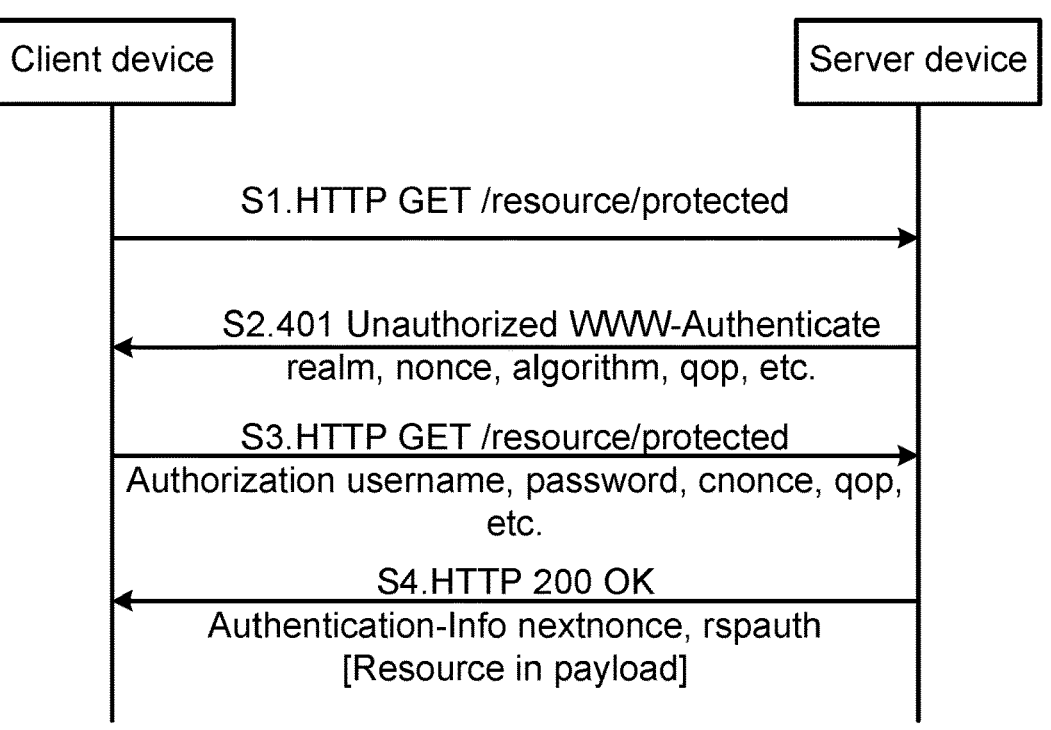
FIGS. 1 and 2 are signalling diagrams according to examples.
Figure 2:
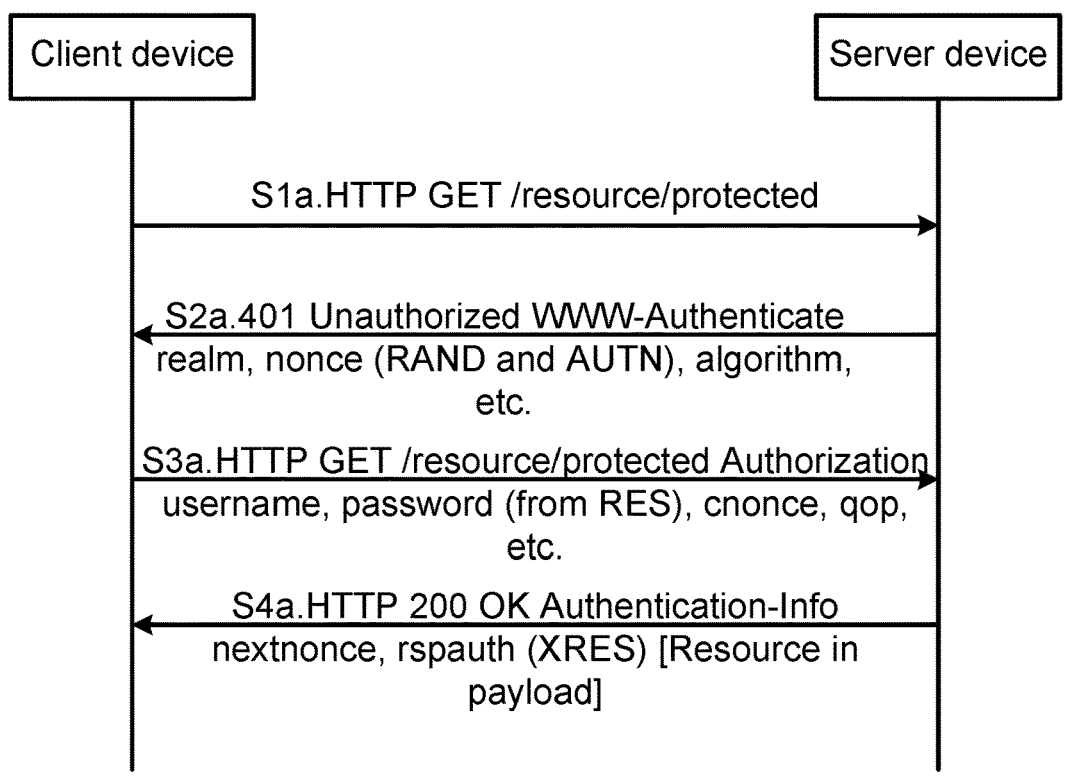
Figure 3:
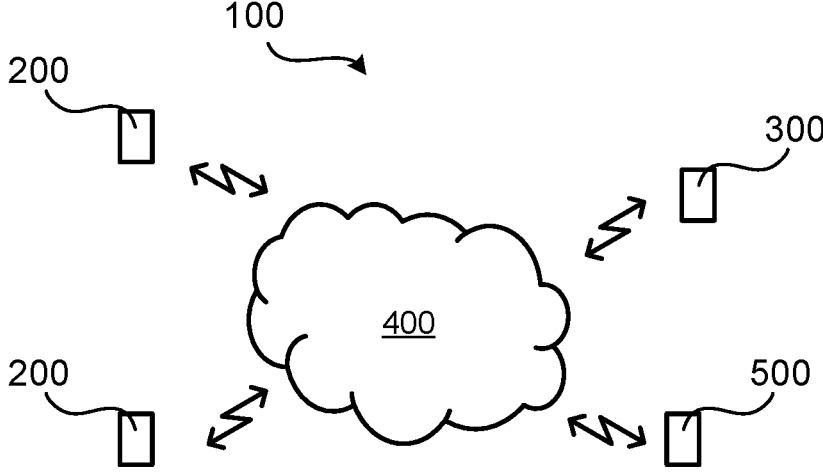
FIG. 3 is a schematic diagram illustrating a communication system according to embodiments.

FIG. 3 is a schematic diagram illustrating a communication system 100 where embodiments presented herein can be applied. The communication system 100 comprises client devices 200, a server device 300, and a malicious proxy 500. The client devices 200 and the server device 300 communicate over a network 400. The network might be a wireless network, or a wired network, or a partly wireless network and a partly wired network. As such, the network 400 might comprise a plurality of network entities, such as access network nodes, gateways, core network nodes, etc.

As noted above, there is still a need for improved digest access authentication between a server device 300 and a client device 200.

The embodiments disclosed herein therefore relate to mechanisms for establishing forward secrecy during digest access authentication. In order to obtain such mechanisms there is provided a client device 200, a method performed by the client device 200, a computer program product comprising code, for example in the form of a computer program, that when run on processing circuitry of the client device 200, causes the client device 200 to perform the method. In order to obtain such mechanisms there is further provided a server device 300, a method performed by the server device 300, and a computer program product comprising code, for example in the form of a computer program, that when run on processing circuitry of the server device 300, causes the server device 300 to perform the method.

The embodiments disclosed herein aim at providing perfect forward secrecy (PFS; also just referred to as forward secrecy (FS)) to enhance the security of traditional HTTP digest authentication. This can be achieved by performing a key exchange and including the resulting shared secret in the digest calculation. The embodiments prevent an attacker who has gained access to the password or USIM/ISIM credentials from decrypting traffic exchanged in the past.

Figure 4:
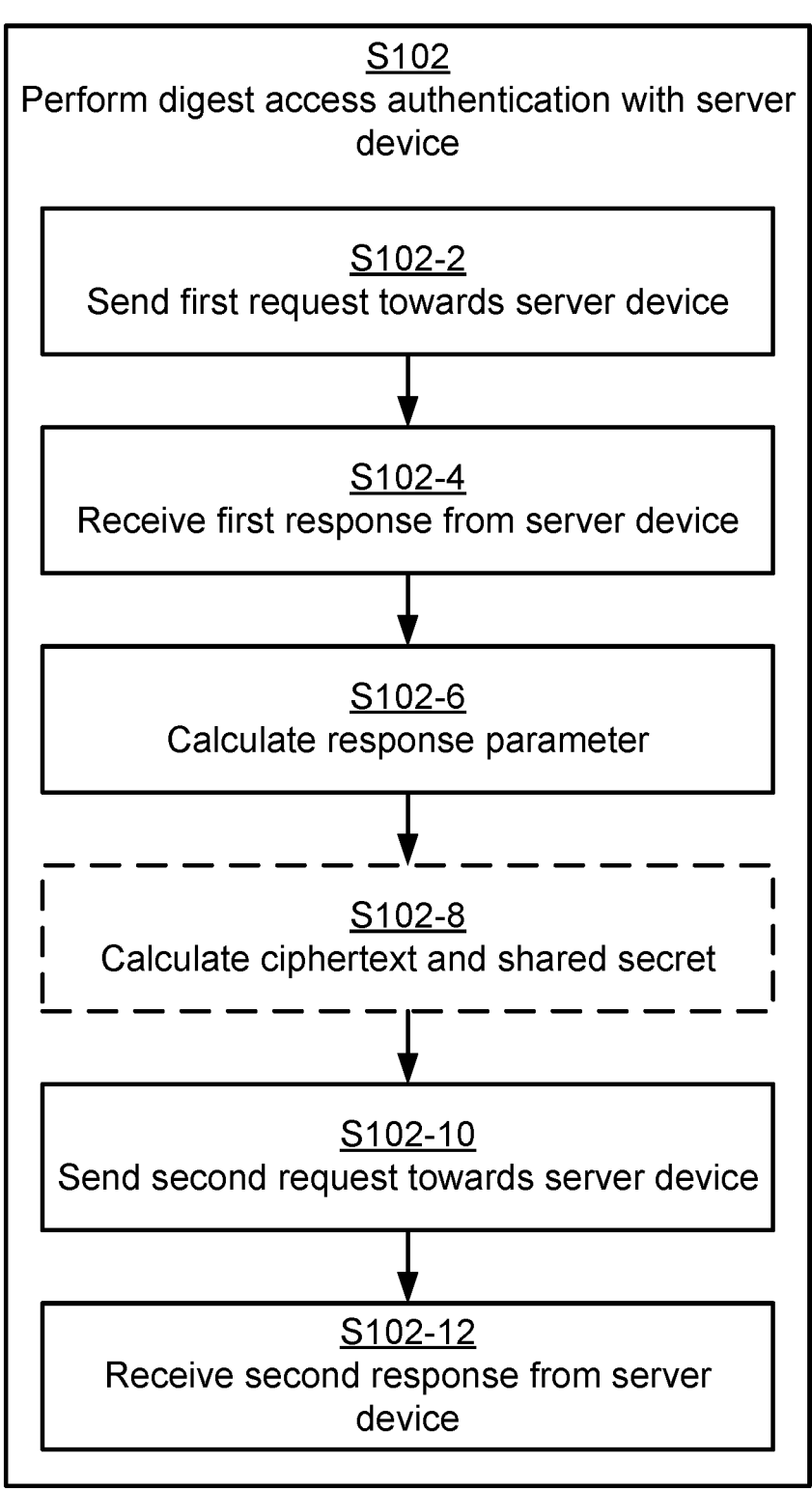
FIGS. 4 and 5 are flowcharts of methods according to embodiments.

Reference is now made to FIG. 4 illustrating a method for establishing forward secrecy during digest access authentication as performed by the client device 200 according to an embodiment.

S102: The client device 200 performs digest access authentication with the server device 300.

The digest access authentication comprises:

S102-2: The client device 200 sends a first request towards the server device 300 for accessing a resource.

S102-4: The client device 200 receives a first response from the server device 300. The first response comprises a challenge and a public component pk of an asymmetric key pair (pk, sk) for a key exchange with the server device 300.

S102-6: The client device 200 calculates, using a digest algorithm, a response parameter. The response parameter is calculated based at least on the challenge and the public component pk of the asymmetric key pair (pk, sk).

S102-10: The client device 200 sends a second request towards the server device 300 for accessing the resource. The second request comprises the calculated response parameter.

S102-12: The client device 200 receives a second response from the server device 300. The second response indicates successful digest access authentication with the server device 300.

Embodiments relating to further details of establishing forward secrecy during digest access authentication as performed by the client device 200 will now be disclosed.

There might be different ways for the public component pk to be provided in the first response as received in step S102-4. In some examples, in the first response, the public component pk is provided in its own WWW-Authenticate header field. In other examples, the public component pk is provided in its own Proxy-Authenticate header field in the first response.

As disclosed above, the response parameter is calculated based at least on the challenge and the public component pk of the asymmetric key pair (pk, sk). In some examples, the asymmetric key pair (pk, sk) is based on finite-field Diffie-Hellman key exchange. For example, $pk=g^x$ and $sk=x$, where g is a public (prime) base, known to the client device 200 and the server device 300, and where x is a random natural number selected by the server device 300. In further examples, the response parameter is calculated from the challenge and using the public component, pk, and based on knowledge of a client password. This is the case for the embodiment in FIG. 6 as will be further described below.

In some examples, the first response further comprises a network authenticator token. The response parameter might then be calculated upon having verified the network authenticator token. The response parameter might be calculated based on a result value, where the result value is calculated from the challenge and, where the response parameter further is calculated using the public component, pk, and a local long-term secret. This is the case for the embodiment in FIG. 7 as will be further described below. The local long-term secret is a secret shared between the client device 200 (or the subscriber of the client device 200) and a home network operator server of the client device 200.

In some examples, the first response comprises further information identifying further parameters based on which the response parameter is to be calculated. The further information might be any of: curve, group, key derivation function, and key encapsulation mechanism. The client device 200 might then use the key encapsulation mechanism to calculate ciphertext, c_kem, and a shared secret, k. Hence, in some embodiments, performing digest access authentication further comprises (optional) step S102-8:

S102-8: The client device 200 calculates ciphertext, c_kem, and a shared secret, k, by subjecting the public component pk to the key encapsulation mechanism. The second request then further comprises the ciphertext, c_kem.

In some examples, the key encapsulation mechanism is based on key exchange using any of: finite-field Diffie-Hellman, elliptic curve Diffie-Hellman, RSA, lattice-based cryptography, code-based key cryptography, isogeny-based cryptography key exchange (where RSA is short for Rivest-Shamir-Adleman).

There might be different ways for the ciphertext to be provided in the second request as sent in step S102-10. In some examples, in the second request, the ciphertext is provided in its own WWW-Authenticate header field. In other examples, in the second request, the ciphertext is provided in its own Proxy-Authenticate header field.

In some examples, a key generated whilst calculating the response parameter is combined with the shared secret, k, to form a new key.

In some examples, the server device 300 in the first response offers several cryptographic algorithms and the client device 200 selects the most secure one that it supports. That is, the first response might comprise at least two challenges, and indications of as many different digest algorithms. One digest algorithm is associated with each challenge. The response parameter is then calculated using one of the challenges using the digest algorithm associated with this one of the challenges. The response parameter is indicative of all the different digest algorithms. This is the case for the embodiment in FIG. 8 as will be further described below.

Figure 5:
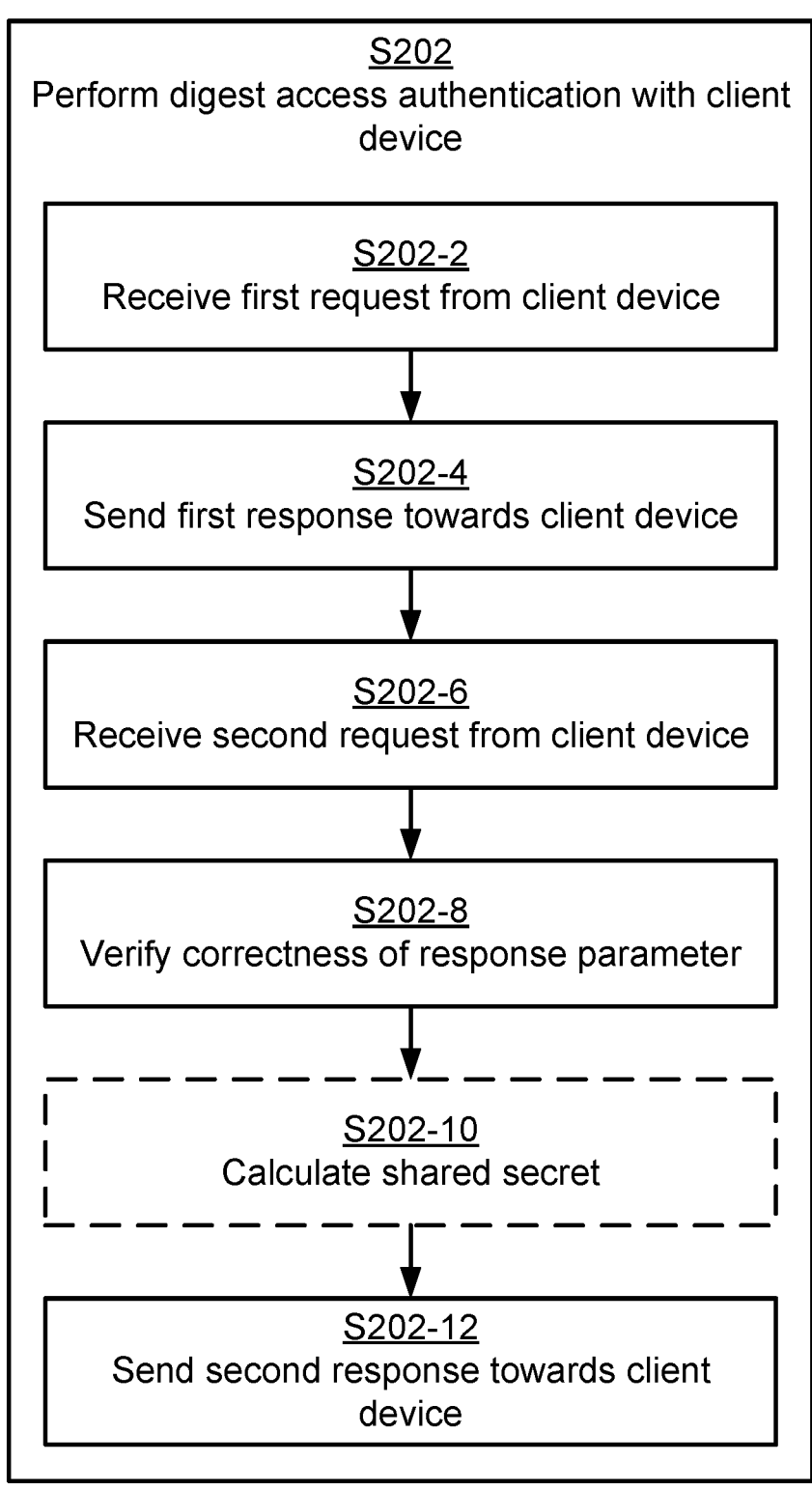

Reference is now made to FIG. 5 illustrating a method for establishing forward secrecy during digest access authentication as performed by the server device 300 according to an embodiment.

S202: The server device 300 performs digest access authentication with the client device 200.

The digest access authentication comprises:

S202-2: The server device 300 receives a first request from the client device 200 for accessing a resource.

S202-4: The server device 300 sends a first response towards the client device 200. The first response comprises a challenge and a public component pk of an asymmetric key pair (pk, sk) for a key exchange with the client device 200.

S202-6: The server device 300 receives a second request from the client device 200 for accessing the resource. The second request comprises a response parameter.

S202-8: The server device 300 verifies correctness of the response parameter only when the response parameter matches a corresponding expected response parameter calculated by the server device 300. The server device 300 uses a digest algorithm to verify correctness of the response parameter. The correctness is verified based at least on the challenge and the public component pk of the asymmetric key pair (pk, sk).

S202-12: The server device 300 sends a second response towards the client device 200. The second response is sent only when the server device 300 has successfully verified correctness of the response parameter. The second response indicates successful digest access authentication with the client device 200.

Embodiments relating to further details of establishing forward secrecy during digest access authentication as performed by the server device 300 will now be disclosed.

There might be different ways for the public component pk to be provided in the first response as received in step S202-4. In some examples, in the first response, the public component pk is provided in its own WWW-Authenticate header field. In other examples, the public component pk is provided in its own Proxy-Authenticate header field in the first response.

As disclosed above in further detail, in some examples, the asymmetric key pair (pk, sk) is based on finite-field Diffie-Hellman key exchange.

In some examples, the expected response parameter is based on an expected result value. The expected result value is calculated from the challenge and using the public component, pk, and based on knowledge of a client password. This is the case for the embodiment in FIG. 6 as will be further described below.

As disclosed above, in some examples, the first response further comprises a network authenticator token. The expected response parameter might then be based on an expected result value, where the expected result value is calculated from the challenge and using the public component, pk, and a local long-term secret. This is the case for the embodiment in FIG. 7 as will be further described below.

As disclosed above, in some examples, the first response comprises further information identifying further parameters based on which the response parameter is to be calculated. The further information might be any of: curve, group, key derivation function, and key encapsulation mechanism. The key encapsulation mechanism might have a corresponding decapsulation mechanism.

The server device 300 might then use the key decapsulation mechanism to calculate a shared secret, k, from received ciphertext, c_kem. The ciphertext, c_kem might be received from the client device 200 in the second request. Hence, in some embodiments, performing digest access authentication further comprises (optional) step S202-10:

S202-10: The server device 300 calculates a shared secret, k, by subjecting the ciphertext, c_kem, and a private key, pk, of the asymmetric key pair, pk, sk, to the key decapsulation mechanism.

In some examples, the key decapsulation mechanism is based on key exchange using any of: finite-field Diffie-Hellman finite-field Diffie-Hellman, elliptic curve Diffie-Hellman, RSA, lattice-based cryptography, code-based key cryptography, isogeny-based cryptography key exchange.

In some examples, a key generated whilst calculating the expected response parameter is combined with the shared secret, k, to form a new key.

As disclosed above, in some examples, the server device 300 in the first response offers several cryptographic algorithms and the client device 200 selects the most secure one that it supports. That is, the first response might comprise at least two challenges, and indications of as many different digest algorithms. One digest algorithm is associated with each challenge. Correctness (of the response parameter, as in S202-12) then indicates that the response parameter has been calculated using one of the different digest algorithms and that the response to this one of the challenges is indicative of all of the different digest algorithms. This is the case for the embodiment in FIG. 8 as will be further described below.

Figure 6:
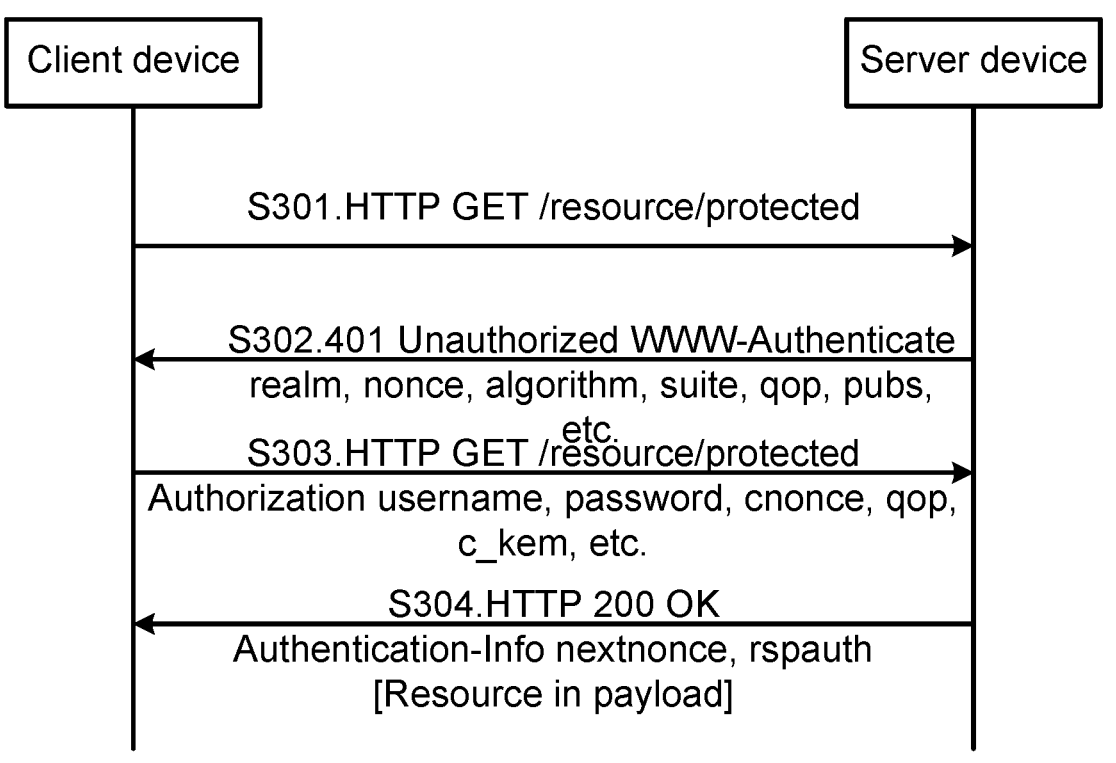
FIGS. 6, 7, and 8 are signalling diagrams according to embodiments

A first particular embodiment for establishing forward secrecy during digest access authentication between the client device 200 and the server device 300 based on at least some of the above disclosed embodiments will now be disclosed in detail with reference to the signalling diagram of FIG. 6.

S301: The client device 200 sends a GET request for a protected resource to the client device 300.

S302: The server device 300 sends an HTTP response with the status code 401 unauthorized. This message includes a WWW-Authenticate header. The header parameters comprise a challenge for the client device's 200 knowledge of the password and includes the public component pk of the server device's 300 asymmetric key pair (pk, sk) to perform a key exchange. The public component of the server device's 300 asymmetric key pair can be carried in existing header parameters or in a new parameter shown as pubs in FIG. 6. Additionally, a suite field can indicate any information about the curve, group, key derivation function, and key encapsulation mechanism desired by the server device 300. Alternatively, it is also possible to encode the information in the existing algorithm field. The key pair might be based on finite-field Diffie Hellman key exchange.

S303: The client device 200 calculates the response parameter based on its knowledge of the password and the public component of the server device's 300 asymmetric key pair pk received in the challenge. The client device 200 uses a Key Encapsulation Mechanism (KEM) to create an encapsulation/ciphertext c_kem and a shared secret k; (c_kem, k)=KEM_Encaps(pk). The client device 200 sends another HTTP request with an Authorization header containing the calculated response and the encapsulation/ciphertext c_kem. The ciphertext can be carried in existing header parameters or in a new parameter shown as c_kem in FIG. 6. The keys generated while calculating the response are combined with the shared secret k (from the key exchange). The Key Encapsulation might be based on finite-field Diffie Hellman key exchange. One example of how the response can be calculated will be described in the following.

> response=H(H(A1):nonce:nc:cnonce:qop:H(A2)), where
> A1=username:realm:passwd:k if the algorithm used is MD5, SHA256 etc. or
> A1=H(username:realm:passwd:nonce-prime:cnonce-prime:k) if the algorithm used is the session variant, i.e., MD5-sess, SHA-256-sess. Here nonce-prime is the nonce sent by the server device 300 in the WWW-Authenticate header and cnonce-prime is the cnonce included by the client device 200 in the response,
> A2=method:request-uri: suite if the qop used is auth, or
> A2=method:request-uri:H(entity-body): suite if the qop used is auth-int. It is noted that the entity-body is not the body of the message.

S304: The server device 300, upon receiving the challenge response, performs the corresponding calculations with its knowledge of the client device's 200 password, its own asymmetric key pair (pk, sk), and the encapsulation/ ciphertext c_kem received. The server device 300 uses a corresponding decapsulation mechanism to retrieve the shared secret k; k=KEM_Decaps(sk, c_kem). The server device 300 verifies that the received response to the challenge matches locally computed values. If there is a match, the server device 300 sends an HTTP response with status code 200 OK and any payload to the client device 200. The keys generated while verifying the response are combined with the shared secret k (from the key exchange). If the setup supports mutual authentication where the server device 300 also calculates a parameter rspauth and includes it in an Authentication-Info header, then the rspauth calculation combines the result of the key exchange with the client device's 200 password. The Key Decapsulation might be based on finite-field Diffie Hellman key exchange.

For more advanced versions of digest authentication with better security properties, additional parameters from the headers can be included when calculating the digest response. The parameters can be the pubs (public key of the server device 300), c_cipher (public key of the client device 200), algorithm (offered by the server device 300), suite (offered by the server device 300).

Figure 7:
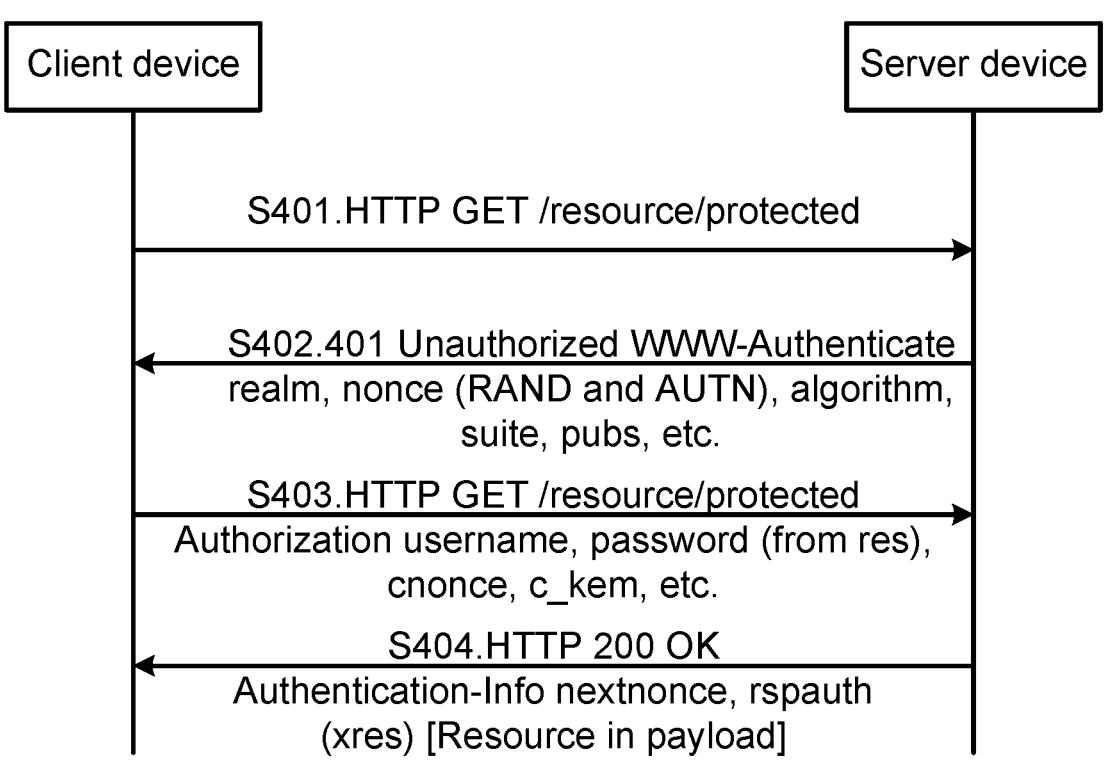

A second particular embodiment for establishing forward secrecy during digest access authentication between the client device 200 and the server device 300 based on at least some of the above disclosed embodiments will now be disclosed in detail with reference to the signalling diagram of FIG. 7.

S401: The client device 200 sends a GET request for a protected resource to the client device 300.

S402: The server device 300 sends an HTTP response with the status code 401 unauthorized. This message includes a WWW-Authenticate header. The server device 300 adds a random challenge RAND, and a network authenticator token AUTN in the authentication vector to the nonce header parameter. The header also comprises the public component pk of the server device's 300 asymmetric key pair (pk, sk) to perform a key exchange. The public component of the server device's 300 asymmetric key pair can be carried in existing header parameters or in a new parameter shown as pubs in FIG. 7. Additionally, a suite field can indicate any information about the curve, group, key derivation function, and key encapsulation mechanism desired by the server device 300. Alternatively, it is also possible to encode the information in the existing algorithm field. The key pair might be based on finite-field Diffie Hellman key exchange.

S403: The client device 200 verifies the AUTN comprised in the nonce received from the server device 300. If the verification is successful, the client device 200 calculates the response parameter based on the RES value calculated using the long-term secret stored on the USIM/ISIM and the public component of the server device's 300 asymmetric key pair pk received in the challenge. The client device 200 uses a KEM to create an encapsulation/ciphertext c_kem and a shared secret k; (c_kem, k)=KEM_Encaps (pk). The client device 200 sends another HTTP request with an Authorization header containing the calculated response and the encapsulation/ciphertext c_kem. The ciphertext can be carried in existing header parameters or in a new parameter shown as c_kem in FIG. 7. The keys generated while calculating the response are combined with the shared secret k (from the key exchange). The Key Encapsulation might be based on finite-field Diffie Hellman key exchange. One example of how the response can be calculated will be described in the following.

The Password is Computed as:

PRF(RES‖IK‖CK‖k, "http-digest-akav2-password")
where CK is the cipher key, IK is Integrity key, and
RES is the response calculated from AKA.

S404: The server device 300, upon receiving the challenge response, performs the corresponding calculations with its own asymmetric key pair (pk, sk), and the received encapsulation/ciphertext c_kem. The server device 300 use a corresponding decapsulation mechanism to retrieve the shared secret k; k=KEM_Decaps(sk, c_kem). The server device 300 uses the shared secret k and the expected response (XRES) in the authentication vector to verify that the received response to the challenge matches locally computed values. If they match, the server device 300 sends an HTTP response with status code 200 OK and any payload. The keys generated while verifying the response are combined with the shared secret k (from the key exchange). If the setup supports mutual authentication where the server device 300 also calculates a parameter rspauth and includes it in an Authentication-Info header, then the rspauth calculation combines the result of the key exchange with the client device's 200 password (such as the shared secret k with the keys resulting from the digest authentication). The Key Decapsulation might be based on finite-field Diffie Hellman key exchange.

The server device 300 uses PRF(XRES‖IK‖CK‖k, "http-digest-akav2-password") when verifying the password received.

The keys for session integrity and confidentiality:

IK'=PRF(IK, k, "http-digest-akav2-integritykey"), and
CK'=PRF(CK, k, "http-digest-akav2-cipherkey").

For more advanced versions of digest authentication with better security properties, additional parameters from the headers can be included when calculating the digest response. The parameters can be the pubs (public key of the server device 300), c_kem (ciphertext), algorithm (offered by the server device 300), suite (offered by the server device 300). In such a case, the digest response password can be calculated as follows:

PRF(RES‖IK‖CK‖suite‖pubs‖c_kem‖k, "http-digest-akav2-password")

The server device 300 correspondingly uses PRF (XRES‖IK‖CK‖suite‖pubs‖c_kem‖k, "http-digest-akav2-password") when verifying the password received.

Figure 8:
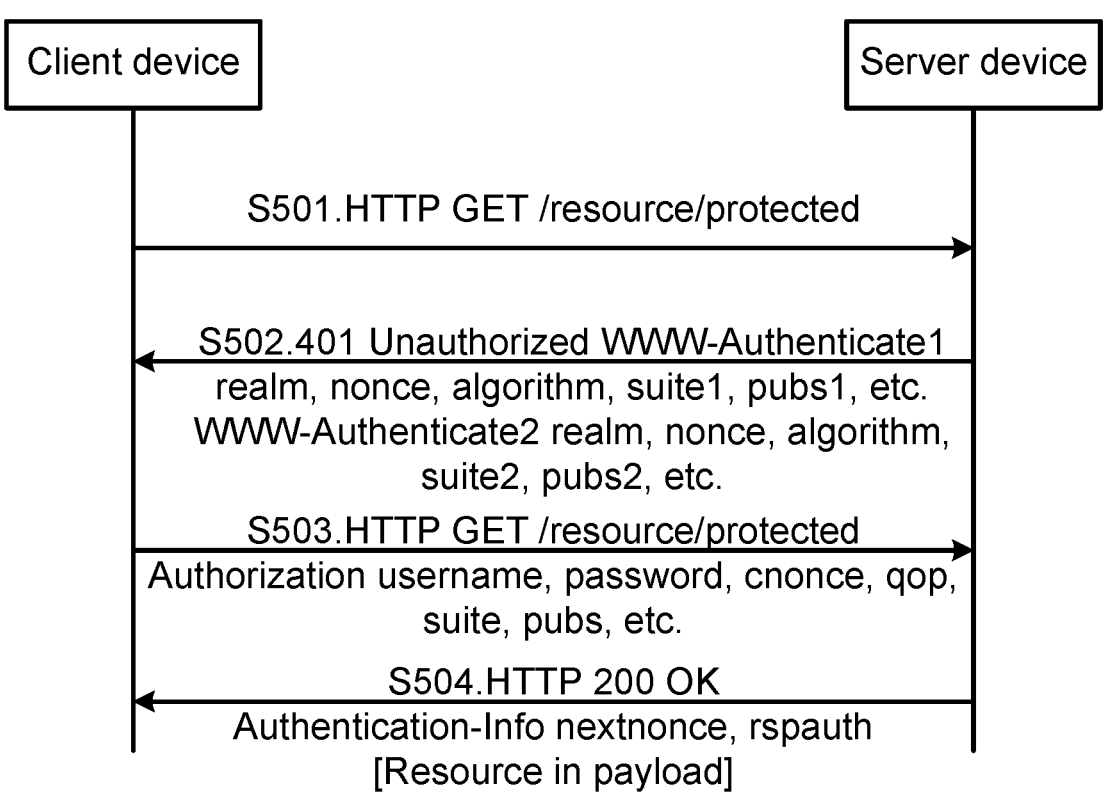

A third particular embodiment for establishing forward secrecy during digest access authentication between the client device 200 and the server device 300 based on at least some of the above disclosed embodiments will now be disclosed in detail with reference to the signalling diagram of FIG. 8. Digest authentication, as specified in aforementioned RFC 7616 also supports negotiation of the digest algorithm. The server device 300 in such cases challenges a client device 200 by responding with a "401 Unauthorized" message and includes several WWW-Authenticate header fields, each with a different digest algorithm. The herein disclosed embodiments can be extended to allow the server device 300 to offer several cryptographic algorithms and let the client device 200 select the most secure cryptographic algorithm that it supports. This property is also called as cryptographic agility and an example of how this is implemented with PFS is shown in FIG. 8.

S501: The client device 200 sends a GET request for a protected resource to the client device 300.

S502: The server device 300 sends an HTTP response with the status code 401 unauthorized. This message includes two or more WWW-Authenticate headers. The headers comprise the public component pk of the server device's 300 asymmetric key pair (pk, sk) to perform a key exchange. The public component of the server device's 300 asymmetric key pair can be carried in existing header parameters or in a new parameter shown as pubs in FIG. 8. Additionally, a suite field can indicate any information about the curve, group, key derivation function, and key encapsulation mechanism desired by the server device 300. Alternatively, it is also possible to encode the information in the existing algorithm field.

S503: The client device 200 upon receiving multiple headers selects its most preferred and/or secure group/curve and algorithm combination. The client device 200 then calculates the response parameter based on its knowledge of the password and the public component of the server device's 300 asymmetric key pair pk received in the challenge. The client device 200 uses a KEM to create an encapsulation/ciphertext c_kem and a shared secret k; (c_kem, k)=KEM_Encaps (pk). The client device 200 sends another HTTP request with an Authorization header comprising the calculated response and the encapsulation/ciphertext c_kem. The ciphertext can be carried in existing header parameters or in a new parameter shown as c_kem in FIG. 7. The keys generated while calculating the response are combined with the shared secret k (from the key exchange). One example of how the response can be calculated will be described in the following.

response=H(H(A1):nonce:nc:cnonce:qop:H(A2)), where
A1=username:realm:passwd:k if the algorithm used is
MD5, SHA256 etc. or
A1=H(username:realm:passwd:nonce-prime:cnonce-
prime:k) if the algorithm used is the session variant,
i.e., MD5-sess, SHA-256-sess. Here nonce-prime is the
nonce sent by the server device 300 in the WWW-
Authenticate header and cnonce-prime is the cnonce
included by the client device 200 in the response, and
A2=method:request-uri:suite1:suite2:suite: if the qop
used is auth, or
A2=method:request-uri:H(entity-body):suite1:suite2:
suite if the qop used is auth-int. It is noted that the
entity-body is not the body of the message.

S504: The server device 300, upon receiving the challenge response, performs the corresponding calculations with its own asymmetric key pair (pk, sk), and the encapsulation/ciphertext c_kem received. The server device 300 use a corresponding decapsulation mechanism to retrieve the shared secret k; k=KEM_Decaps(sk, c_kem). The server device 300 verifies that the received response to the challenge matches locally computed values. If they match, the server device 300 sends an HTTP response with status code 200 OK and any payload. The keys generated while verifying the response are combined with the shared secret k (from the key exchange). If the setup supports mutual authentication where the server device 300 also calculates a parameter rspauth and includes it in an Authentication-Info header, then the rspauth calculation combines the result of the key exchange with the client device's 200 password (such as the shared secret k with the keys resulting from the digest authentication). To protect downgrade attacks, the calculations of the keys include all the suites offered by the server device 300 and the one selected by the client device 200.

For more advanced versions of digest authentication with better security properties, additional parameters from the headers can be included when calculating the digest response. The parameters can be the pubs (public key of the server device 300), pubc (public key of the client device 200), algorithm (offered by the server device 300), suite (offered by the server device 300).

Figure 9:
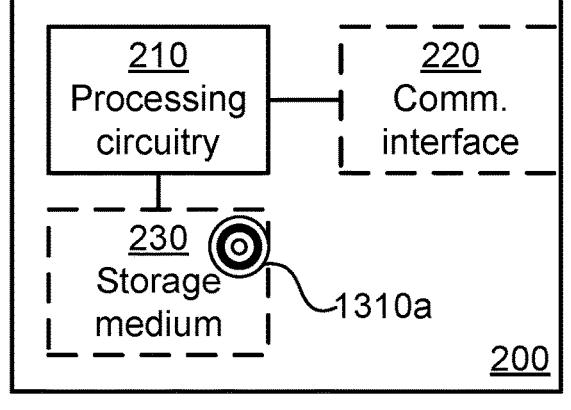
FIG. 9 is a schematic diagram showing functional units of a client device according to an embodiment.

FIG. 9 schematically illustrates, in terms of a number of functional units, the components of a client device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1310*a* (as in FIG. 13), e.g. in the form of a storage medium 230. The processing circuitry 210 may further be provided as at least one application specific integrated circuit (ASIC), or field programmable gate array (FPGA).

Particularly, the processing circuitry 210 is configured to cause the client device 200 to perform a set of operations, or steps, as disclosed above. For example, the storage medium 230 may store the set of operations, and the processing circuitry 210 may be configured to retrieve the set of operations from the storage medium 230 to cause the client device 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The client device 200 may further comprise a communications interface 220 for communications with other entities, functions, nodes, and devices, such as the server device 300. As such the communications interface 220 may comprise one or more transmitters and receivers, comprising analogue and digital components.

The processing circuitry 210 controls the general operation of the client device 200 e.g. by sending data and control signals to the communications interface 220 and the storage medium 230, by receiving data and reports from the communications interface 220, and by retrieving data and instructions from the storage medium 230. Other components, as well as the related functionality, of the client device 200 are omitted in order not to obscure the concepts presented herein.

Figure 10:
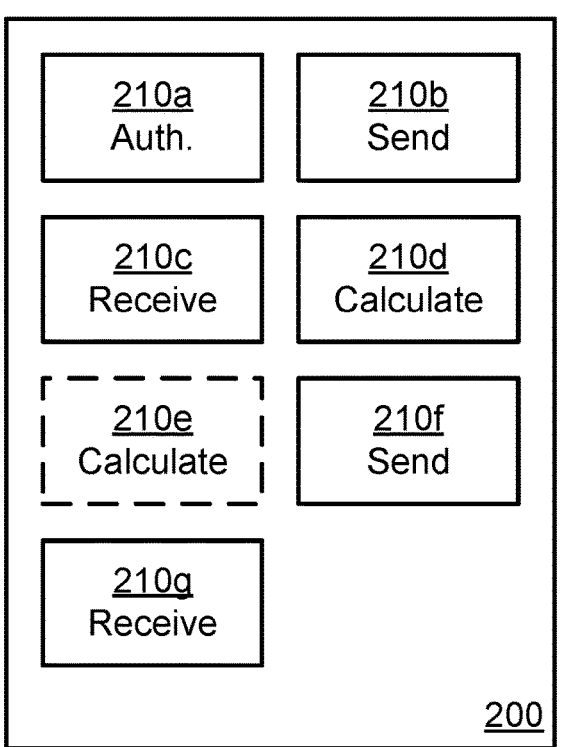
FIG. 10 is a schematic diagram showing functional modules of a client device according to an embodiment.

FIG. 10 schematically illustrates, in terms of a number of functional modules, the components of a client device 200 according to an embodiment. The client device 200 of FIG. 10 comprises a number of functional modules; an authenticate module 210*a* configured to perform step S102, a send module 210*b* configured to perform step S102-2, a receive module 210*c* configured to perform step S102-4, a calculate module 210*d* configured to perform step S102-6, a send module 21 of configured to perform step S102-10, and a receive module 210*g* configured to perform step S102-12. The client device 200 of FIG. 9 may further comprise a number of optional functional modules, such as a calculate module 210*e* configured to perform step S102-8. In general terms, each functional module 210*a*: 210*g* may be implemented in hardware or in software. Preferably, one or more or all functional modules 210*a*: 210*g* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*: 210*g* and to execute these instructions, thereby performing any steps of the client device 200 as disclosed herein.

The client device 200 may be provided as a standalone device or as a part of at least one further device. For example, the client device 200 may be provided in any of a portable wireless device, mobile station, mobile phone, handset, wireless local loop phone, user equipment (UE), smartphone, laptop computer, tablet computer, wireless modem, wireless sensor device, Internet of Things (IoT) device, network equipped vehicle, etc.

Figure 11:
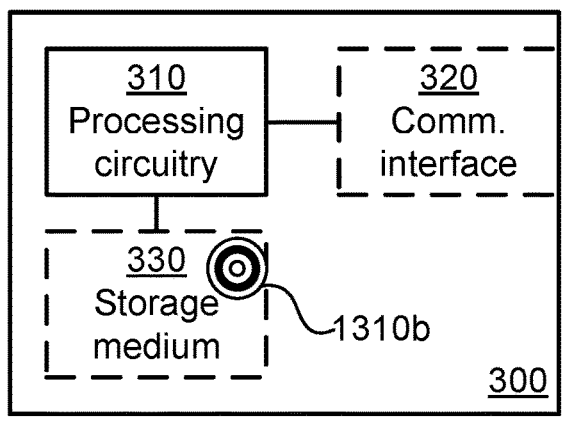
FIG. 11 is a schematic diagram showing functional units of a server device according to an embodiment.

FIG. 11 schematically illustrates, in terms of a number of functional units, the components of a server device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1310*b* (as in FIG. 13), e.g. in the form of a storage medium 330. The processing circuitry 310 may further be provided as at least one application specific integrated circuit (ASIC), or field programmable gate array (FPGA).

Particularly, the processing circuitry 310 is configured to cause the server device 300 to perform a set of operations, or steps, as disclosed above. For example, the storage medium 330 may store the set of operations, and the processing circuitry 310 may be configured to retrieve the set of operations from the storage medium 330 to cause the server device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The server device 300 may further comprise a communications interface 320 for communications with other entities, functions, nodes, and devices, such as the client device 200. As such the communications interface 320 may comprise one or more transmitters and receivers, comprising analogue and digital components.

The processing circuitry 310 controls the general operation of the server device 300 e.g. by sending data and control signals to the communications interface 320 and the storage medium 330, by receiving data and reports from the communications interface 320, and by retrieving data and instructions from the storage medium 330. Other components, as well as the related functionality, of the server device 300 are omitted in order not to obscure the concepts presented herein.

Figure 12:
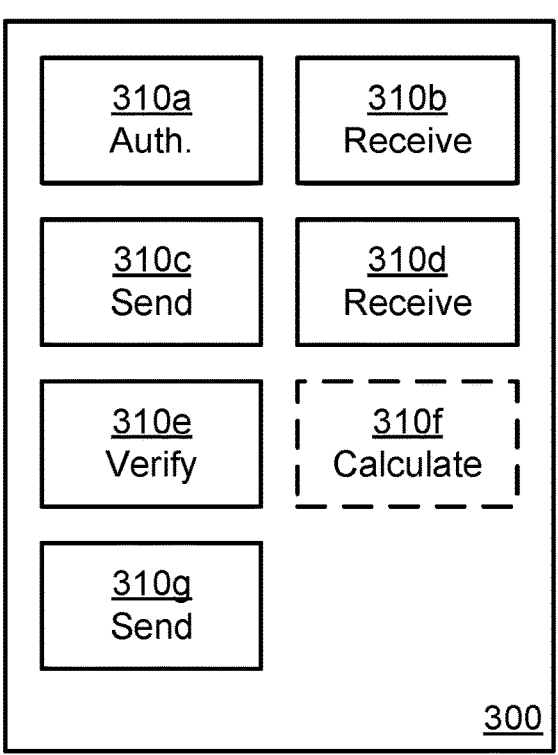
FIG. 12 is a schematic diagram showing functional modules of a server device according to an embodiment.

FIG. 12 schematically illustrates, in terms of a number of functional modules, the components of a server device 300 according to an embodiment. The server device 300 of FIG. 12 comprises a number of functional modules; an authenticate module 310*a* configured to perform step S202, a receive module 310*b* configured to perform step S202-2, a send module 310*c* configured to perform step S202-4, a receive module 310*d* configured to perform step S202-6, a verify module 310*e* configured to perform step 202-8, and a send module 310*g* configured to perform step S202-12. The server device 300 of FIG. 12 may further comprise a number of optional functional modules, such as a calculate module 31 of configured to perform step S202-10. In general terms, each functional module 310*a*: 310*g* may be implemented in hardware or in software. Preferably, one or more or all functional modules 310*a*: 310*g* may be implemented by the processing circuitry 310, possibly in cooperation with the communications interface 320 and/or the storage medium 330. The processing circuitry 310 may thus be arranged to from the storage medium 330 fetch instructions as provided by a functional module 310a: 310g and to execute these instructions, thereby performing any steps of the server device 300 as disclosed herein.

The server device 300 may be provided as a standalone device or as a part of at least one further device. Alternatively, functionality of the server device 300 may be distributed between at least two devices, or nodes. These at least two nodes, or devices, may either be part of the same network part (such as the radio access network or the core network) or may be spread between at least two such network parts. Thus, a first portion of the instructions performed by the server device 300 may be executed in a first device, and a second portion of the instructions performed by the server device 300 may be executed in a second device; the herein disclosed embodiments are not limited to any particular number of devices on which the instructions performed by the server device 300 may be executed. Hence, the methods according to the herein disclosed embodiments are suitable to be performed by a server device 300 residing in a cloud computational environment. Therefore, although a single processing circuitry 310 is illustrated in FIG. 11 the processing circuitry 310 may be distributed among a plurality of devices, or nodes. The same applies to the functional modules 310a: 310g of FIG. 12 and the computer program 1320b of FIG. 13.

Figure 13:
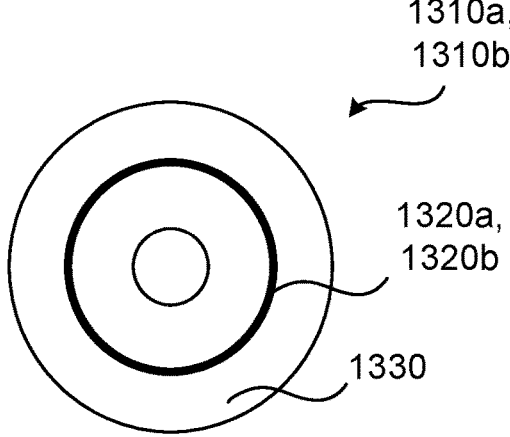
FIG. 13 shows one example of a computer program product comprising computer readable means according to an embodiment.

FIG. 13 shows one example of a computer program product 1310a, 1310b comprising computer readable means 1330. On this computer readable means 1330, a computer program 1320a can be stored, which computer program 1320a can cause the processing circuitry 210 and thereto operatively coupled entities and devices, such as the communications interface 220 and the storage medium 230, to execute methods according to embodiments described herein. The computer program 1320a and/or computer program product 1310a may thus provide means for performing any steps of the client device 200 as herein disclosed. On this computer readable means 1330, a computer program 1320b can be stored, which computer program 1320b can cause the processing circuitry 310 and thereto operatively coupled entities and devices, such as the communications interface 320 and the storage medium 330, to execute methods according to embodiments described herein. The computer program 1320b and/or computer program product 1310b may thus provide means for performing any steps of the server device 300 as herein disclosed.

In the example of FIG. 13, the computer program product 1310a, 1310b is illustrated as an optical disc, such as a CD (compact disc) or a DVD (digital versatile disc) or a Blu-Ray disc. The computer program product 1310a, 1310b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320a, 1320b is here schematically shown as a track on the depicted optical disk, the computer program 1320a, 1320b can be stored in any way which is suitable for the computer program product 1310a, 1310b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for establishing forward secrecy during digest access authentication, the method being performed by a client device, the method comprising:
performing digest access authentication with a server device, the digest access authentication comprising:
sending a first request towards the server device for accessing a resource;
receiving a first response from the server device, wherein the first response comprises a challenge and a public component, pk, of an asymmetric key pair, (pk, sk), for a key exchange with the server device, and information identifying a key encapsulation mechanism;
calculating, using a digest algorithm, a response parameter based at least on the challenge and the public component of the asymmetric key pair;
calculating ciphertext and a shared secret by subjecting the public component to the key encapsulation mechanism identified in the first response;
sending a second request towards the server device for accessing the resource, wherein the second request comprises the calculated response parameter and the ciphertext; and
receiving a second response from the server device, wherein the second response indicates successful digest access authentication with the server device.

2. The method according to claim 1, wherein, in the first response, the public component, pk, is provided in its own WWW-Authenticate header field or its own Proxy-Authenticate header field.

3. The method according to claim 1, wherein the asymmetric key pair, (pk, sk) is based on finite-field Diffie-Hellman key exchange.

4. The method according to claim 1, wherein the response parameter is calculated from the challenge and using the public component, pk, and based on knowledge of a client password.

5. The method according to claim 1, wherein the first response further comprises at least one of:
a network authenticator token,
further information identifying further parameters for calculating the response parameter; or
at least two challenges, and indications of as many different digest algorithms, one digest algorithm being associated with each challenge, wherein the response parameter is calculated using one of the at least two challenges using the digest algorithm associated with said one of the at least two challenges, and wherein the response parameter is indicative of all the different digest algorithms.

6. The method according to claim 5, wherein the response parameter is calculated upon having verified the network authenticator token and/or wherein, when the further information is identified, the response parameter is calculated based on a result value, wherein the result value is calculated from the challenge, and wherein the response parameter further is calculated using the public component, pk, and a local long-term secret.

7. The method according to claim 1, wherein the key encapsulation mechanism is based on key exchange using any of: finite-field Diffie-Hellman, elliptic curve Diffie-Hellman, RSA, lattice-based cryptography, code-based key cryptography, isogeny-based cryptography key exchange.

8. A client device for establishing forward secrecy during digest access authentication, the client device comprising processing circuitry configured to cause the client device to:

perform digest access authentication with a server device, the processing circuitry being configured to cause the client device to, as part of performing the digest access authentication:

send a first request towards the server device for accessing a resource;

receive a first response from the server device, wherein the first response comprises a challenge and a public component, pk, of an asymmetric key pair, (pk, sk), for a key exchange with the server device, and information identifying a key encapsulation mechanism;

calculate, using a digest algorithm, a response parameter based at least on the challenge and the public component of the asymmetric key pair;

calculate ciphertext and a shared secret by subjecting the public component to the key encapsulation mechanism identified in the first response;

send a second request towards the server device for accessing the resource, wherein the second request comprises the calculated response parameter and the ciphertext; and receive a second response from the server device, wherein the second response indicates successful digest access authentication with the server device.

* * * * *